US010498172B2

United States Patent
Nakano et al.

(10) Patent No.: US 10,498,172 B2
(45) Date of Patent: *Dec. 3, 2019

(54) POWER RECEIVING UNIT, POWER RECEIVING CONTROL METHOD, NON-CONTACT FEED SYSTEM, AND ELECTRONIC APPARATUS

(71) Applicant: Sony Corporation, Tokyo (JP)

(72) Inventors: Hiroaki Nakano, Kanagawa (JP); Takaaki Hashiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,692

(22) Filed: Nov. 14, 2017

(65) Prior Publication Data

US 2018/0069436 A1 Mar. 8, 2018

Related U.S. Application Data

(63) Continuation of application No. 14/526,629, filed on Oct. 29, 2014, now Pat. No. 9,847,652.

(30) Foreign Application Priority Data

Dec. 6, 2013 (JP) .................................. 2013-252798

(51) Int. Cl.
| | |
|---|---|
| *H02J 50/12* | (2016.01) |
| *H02J 5/00* | (2016.01) |
| *H02M 7/217* | (2006.01) |
| *H02J 50/80* | (2016.01) |
| *H02J 7/02* | (2016.01) |
| *H02J 7/00* | (2006.01) |

(52) U.S. Cl.
CPC .............. *H02J 50/12* (2016.02); *H02J 5/005* (2013.01); *H02J 7/025* (2013.01); *H02J 50/80* (2016.02); *H02M 7/217* (2013.01); *H02J 7/0044* (2013.01)

(58) Field of Classification Search
CPC ....................................................... H02J 50/12
USPC ......................................................... 307/104
See application file for complete search history.

(56) References Cited

U.S. PATENT DOCUMENTS

| | | | |
|---|---|---|---|
| 8,811,901 B2 | 8/2014 | Shionoiri | |
| 2011/0199028 A1* | 8/2011 | Yamazaki | ............. H02J 7/0054 318/139 |
| 2012/0161536 A1* | 6/2012 | Kamata | ................... H02J 7/025 307/104 |
| 2013/0062959 A1 | 3/2013 | Lee | |

FOREIGN PATENT DOCUMENTS

WO     2010035321 A1    4/2010

* cited by examiner

*Primary Examiner* — Joseph Chang
(74) *Attorney, Agent, or Firm* — Michael Best & Friedrich LLP

(57) ABSTRACT

A power receiving unit includes: a power receiving section configured to receive power that is fed from a power feeding unit in a non-contact manner; a rectification section configured to rectify the power received by the power receiving section; a method determination section configured to identify a feeding method of the power feeding unit; and a target voltage setting section configured to set a target voltage of the power rectified by the rectification section, to a value corresponding to the feeding method identified by the method determination section.

14 Claims, 13 Drawing Sheets

POWER RECEIVING UNIT, POWER RECEIVING CONTROL METHOD, NON-CONTACT FEED SYSTEM, AND ELECTRONIC APPARATUS

CROSS REFERENCE TO RELATED APPLICATIONS

The present application is a Continuation of application Ser. No. 14/526,629, filed Oct. 29, 2014, and claims the benefit of Japanese Priority Patent Application JP 2013-252798 filed Dec. 6, 2013, the entire contents of which are incorporated herein by reference.

BACKGROUND

The present disclosure relates to a power receiving unit receiving power from a power feeding unit wirelessly (in a non-contact manner), a power receiving control method used in such a power receiving unit, and a non-contact feed system and an electronic apparatus that each use such a power receiving unit.

In recent years, a feed system performing wireless power feeding (also called wireless power transfer, contact free, or non-contact power feeding) on consumer electronics devices (CE devices) such as mobile phones and portable music players has attracted attention. In such a feed system, for example, an electronic apparatus (such as a mobile phone) having a power receiving unit may be charged when the electronic apparatus is placed on a power feeding unit such as a power feeding tray. In other words, in such a feed system, the power feeding is allowed to be performed without connecting the power feeding unit and the power receiving unit by a cable or the like.

Examples of the method of performing such wireless power feeding may include, for example, an electromagnetic induction method and a magnetic field resonance method (also called magnetic resonance method) using resonance phenomenon. In these methods, power is transmitted with use of magnetic coupling between a power feeding coil of a power feeding unit and a power receiving coil of a power receiving unit. Among them, as compared with the electromagnetic induction method, advantageously, the magnetic field resonance method is allowed to transmit power even if the power feeding unit and the power receiving unit are away from each other, and feeding efficiency in the magnetic field resonance method does not particularly drop even if positioning between the power feeding unit and the power receiving unit is insufficient.

SUMMARY

In recent years, the above-described feed system is actively studied, and commercialization thereof is progressing rapidly. Standardization also become active in association therewith, and wireless power consortium (WPC), power matters alliance (PMA), alliance for wireless power (A4WP), and the like actively perform creation of standards. Such standards organizations are different in feeding frequency and control method from one another, and do not have compatibility basically. In other words, there is a plurality of feeding methods. However, the respective technologies are extremely close to one another, and thus the possibility that the compatibility is studied in the respective standards organizations in the future is adequately considered, similarly to near field communication (NFC).

Difference in feeding frequency is a large issue in compatibility between the plurality of feeding methods. Difference in feeding frequency indicates that L value of a power receiving coil necessary on a power receiving side is also different. In other words, in order to achieve compatibility between wireless feeding methods that are different in feeding frequency from one another, it is necessary to identify the feeding method by any way, and to change over the L value itself according to the control of the feeding method. However, since a large current flows in wireless feeding, a coil is frequently formed of not a substrate but a winding wire, and changing over of the L value by an intermediate tap or the like imposes a large load in terms of cost and safety. Therefore, development of a system that is capable of handling the plurality of feeding methods without changing over the L value of the power receiving coil or the like is desired.

In International Publication No. WO2010/035321, a feed system in which a target voltage value on a power receiving side is set based on magnitude of received power is disclosed. However, the feed system handles only a specific feeding method, and does not handle a plurality of feeding methods different in feeding frequency from one another.

It is desirable to provide a power receiving unit, a power receiving control method, a non-contact feed system, and an electronic apparatus that are capable of supplying power by a plurality of feeding methods safely and efficiently.

According to an embodiment of the disclosure, there is provided a power receiving unit including: a power receiving section configured to receive power that is fed from a power feeding unit in a non-contact manner; a rectification section configured to rectify the power received by the power receiving section; a method determination section configured to identify a feeding method of the power feeding unit; and a target voltage setting section configured to set a target voltage of the power rectified by the rectification section, to a value corresponding to the feeding method identified by the method determination section.

According to an embodiment of the disclosure, there is provided a power receiving control method including: receiving power that is fed from a power feeding unit in a non-contact manner; rectifying the received power; identifying a feeding method of the power feeding unit by a method determination section; and setting, by a target voltage setting section, a target voltage of the rectified power to a value corresponding to the feeding method identified by the method determination section.

According to an embodiment of the disclosure, there is provided a non-contact feed system provided with a power feeding unit and a power receiving unit. The power receiving unit includes: a power receiving section configured to receive power that is fed from the power feeding unit in a non-contact manner; a rectification section configured to rectify the power received by the power receiving section; a method determination section configured to identify a feeding method of the power feeding unit; and a target voltage setting section configured to set a target voltage of the power rectified by the rectification section, to a value corresponding to the feeding method identified by the method determination section.

According to an embodiment of the disclosure, there is provided an electronic apparatus provided with a power receiving unit and a load connected to the power receiving unit. The power receiving unit includes: a power receiving section configured to receive power that is fed from a power feeding unit in a non-contact manner; a rectification section configured to rectify the power received by the power receiving section; a method determination section configured to identify a feeding method of the power feeding unit; and a target voltage setting section configured to set a target voltage of the power rectified by the rectification section, to a value corresponding to the feeding method identified by the method determination section.

In the power receiving unit, the power receiving control method, the non-contact feed system, and the electronic apparatus according to the respective embodiments of the disclosure, the feeding method of the power feeding unit is identified, and the target voltage of the rectified power is set to a value corresponding to the identified feeding method.

According to the power receiving unit, the power receiving control method, the non-contact feed system, and the electronic apparatus according to the respective embodiments of the disclosure, the feeding method of the power feeding unit is identified, and the target voltage of the rectified power on the power receiving side is set to the value corresponding to the identified feeding method. Therefore, it is possible to supply power by the plurality of feeding methods safely and efficiently.

Note that effects of the embodiments of the present disclosure are not limited to this effect, and may include any of effects that will be described in the present disclosure.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the disclosure will be described in detail with reference to drawings. Note that description will be given in the following order.

1. First embodiment (an example of controlling a target voltage according to a feeding method)
   1.1 Configuration
   1.2 Operation
   1.3 Effects
2. Second embodiment (an example of changing over a method of conversion operation of a regulator according to a feeding method)
   2.1 First configuration example of regulator 210
   2.2 Second configuration example of regulator 210
   2.3 Third configuration example of regulator 210
   2.4 Effects
3. Third embodiment (an example of controlling a protection setting voltage according to a feeding method)
   3.1 Configuration
   3.2 Effects
4. Fourth embodiment (an example of changing over a circuit configuration (a circuit constant) according to a feeding method)
   4.1 Configuration example in which overvoltage protection circuit 214 is changed over
   4.2 Configuration example in which communication section 206 is changed over
   4.3 Effects
5. Other embodiments 1. First Embodiment

[1.1 Configuration]
(Overall Configuration of Feed System 4)

Figure 1:
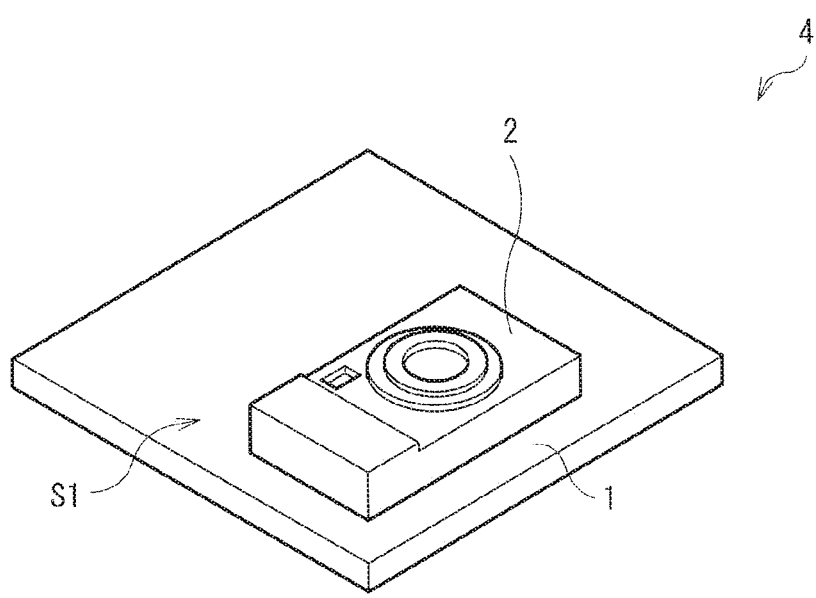
FIG. 1 is an appearance perspective view illustrating an example of a feed system according to a first embodiment of the disclosure.
Figure 2:
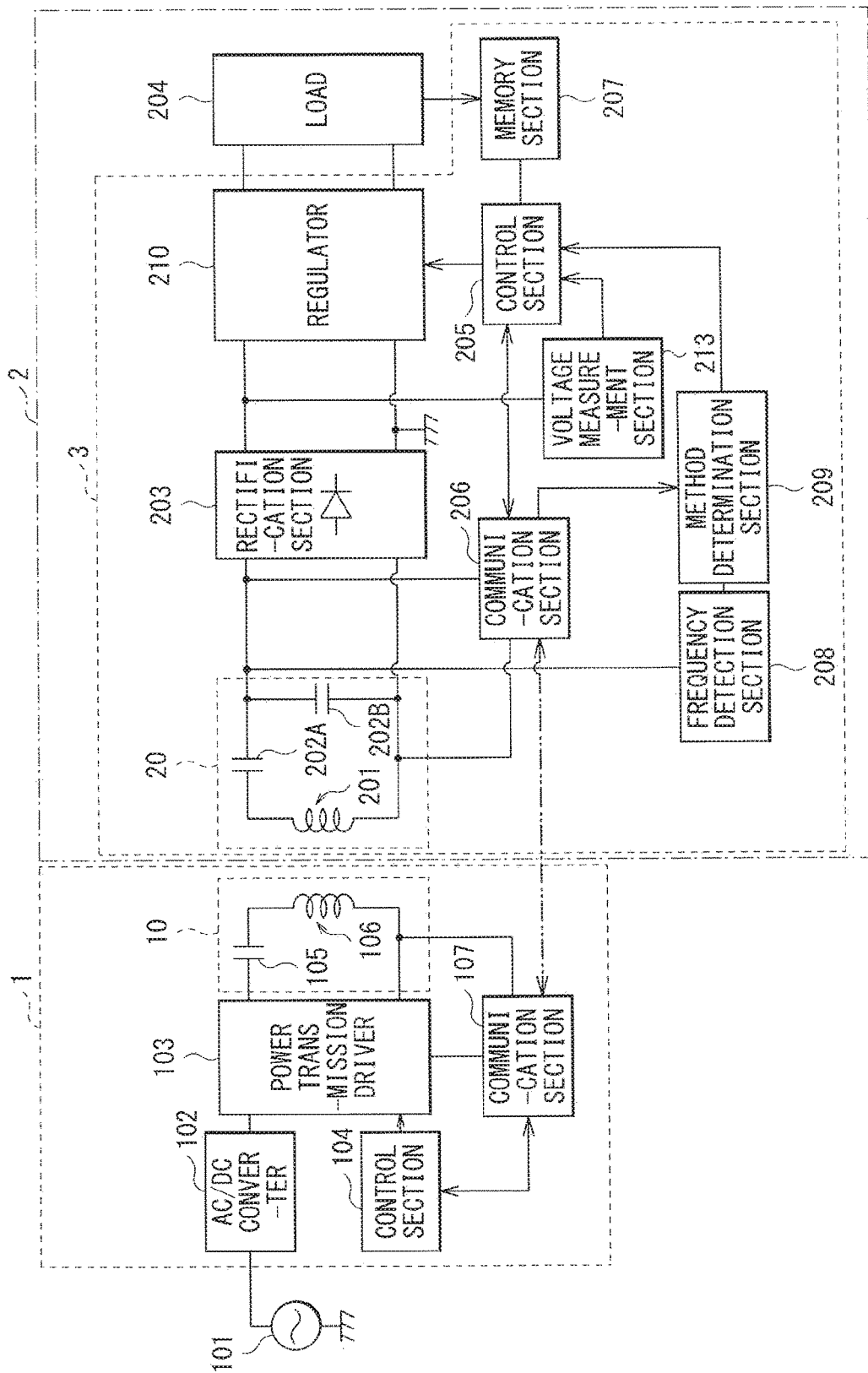
FIG. 2 is a block diagram illustrating an example of a circuit configuration of a feed system illustrated in FIG. 1.

FIG. 1 illustrates an overall configuration example of a feed system 4 according to a first embodiment of the disclosure. FIG. 2 illustrates an example of a circuit configuration of the feed system 4. Note that a power receiving unit, a power receiving control method, and an electronic apparatus according to the respective embodiments of the disclosure are embodied by the present embodiment, and therefore are described together.

The feed system 4 is a system (a non-contact feed system) performing non-contact power transmission (power supply, power feeding, or power transmission) with use of a magnetic field (with use of magnetic field resonance, electromagnetic induction, or the like; the same applies hereinafter). The feed system 4 includes a power feeding unit 1 (a primary-side unit) and one or a plurality of electronic apparatuses (in this example, one electronic apparatus 2; a secondary-side unit) as a feeding target apparatus having a power receiving unit 3 (FIG. 2).

For example, as illustrated in FIG. 1, in the feed system 4, when the electronic apparatus 2 is disposed on (or placed in the vicinity of) a power feeding surface (a power transmission surface) S1 of the power feeding unit 1, power transmission is performed from the power feeding unit 1 to the electronic apparatus 2. Here, as an example, the power feeding unit 1 has a mat shape (a tray shape) in which an area of the power feeding surface S1 is larger than the electronic apparatus 2 to be fed with power.

A power feeding coil 106 (FIG. 2) described later is disposed on the power feeding surface S1 (on a side in contact with the power receiving unit 3 included in the electronic apparatus 2) of the power feeding unit 1, and a power receiving coil 201 (FIG. 2) described later is disposed on a power receiving surface (on a side in contact with the power feeding unit 1) of the electronic apparatus 2. The power feeding unit 1 transmits power to the electronic apparatus 2 with use of magnetic coupling through the power feeding coil 106 and the power receiving coil 201. At this time, the power receiving unit 3 of the electronic apparatus 2 may communicates with the power feeding unit 1 through, for example, load modulation, and instructs the power feeding unit 1 to increase or decrease the feed power. As a result, a user is allowed to charge the electronic apparatus 2 or the like without connecting an alternating current (AC) adapter or the like with the electronic apparatus 2, which makes it possible to enhance usability of the user.

In the example of FIG. 1, the electronic apparatus 2 is a digital camera; however, the electronic apparatus 2 is not limited thereto. For example, various portable terminal devices such as a video camera, a smartphone, a mobile battery, a personal computer, a tablet, a phablet, an electronic book reader, an audio player, an audio recorder, a speaker, a headphone, a head-mounted display, an accessory, a game machine, a wearable appliance, a glasses-type device, a wrist-mounted device, and a medical instrument may be used. The area of the power feeding surface S1 of the power feeding unit 1 may desirably larger than an area of a power receiving surface of the electronic apparatus 2. Note that this is not limitative, and for example, the area of the power feeding surface S1 may be equivalent to the area of the power receiving surface of the electronic apparatus 2, or may be smaller than the area of the power receiving surface of the electronic apparatus 2.

Moreover, the power feeding unit 1 may be configured so as to be embedded in other electronic apparatuses or electric appliances, or may be configured so as to be embedded in a wall, a floor, or the like. Moreover, the electronic apparatus 2 may be configured so as to have a function similar to that of the power feeding unit 1 in addition to the power receiving unit 3, and to supply power to the other power receiving units.

(Configuration of Power Feeding Unit 1)

As illustrated in FIG. 2, the power feeding unit 1 includes an AC/DC converter 102, a power transmission driver 103, a control section 104, a power feeding section 10 having a capacitor 105 and the power feeding coil 106, and a communication section 107.

The AC/DC converter 102 converts an AC power source 101 such as AC 100 V into DC low-voltage power, and supplies the DC low-voltage power to the power transmission driver 103. Note that using the AC power 101 is an example, and for example, a DC power source may be used as an input power source. The power feeding section 10 is connected to the power transmission driver 103, and feed power of a predetermined feeding frequency is supplied from the power transmission driver 103 to the power feeding coil 106.

The power feeding coil 106 and the capacitor 105 are electrically connected in series to each other. The power feeding section 10 has a function of using the power feeding coil 106 to radiate a magnetic field (magnetic flux) from the power feeding surface S1 toward the electronic apparatus 2. In the power feeding section 10, an LC resonance circuit is configured using the power feeding coil 106 and the capacitor 105. Further, the LC resonance circuit formed in the power feeding section and an LC resonance circuit formed in a power receiving section 20 described later are magnetically coupled with each other (mutual induction).

The communication section 107 bi-directionally communicates with the power receiving unit 3. The communication by the communication section 107 may be performed, for example, in such a manner that a transmission signal is superimposed on the feed power supplied from the power transmission driver 103 to the power feeding coil 106. Specifically, information is modulated through amplitude shift keying (ASK), frequency shift keying (FSK) or the like with use of a frequency of the feed power supplied to the power feeding coil 106, as a carrier wave, and is then transmitted. The transmission of the information from the power receiving unit 3 side to the communication section 107 is also performed by the similar method. Alternatively, the information may be transmitted from the power receiving unit 3 side to the communication section 107 with use of a subcarrier whose frequency is different from that of the feed power. As the method of bi-directionally transmitting information together with power in a non-contact manner between adjacent coils, various methods are already used practically in communication between a non-contact IC card and a reader, or the like, and any method may be applied in the example of the present disclosure.

Moreover, the communication section 107 may communicate with a communication section 206 of the power receiving unit 3 described later with use of other wireless transmission paths different from the feed system or a wired transmission path without being limited to the communication method in which the transmission signal is superimposed on the feed power to perform communication.

The communication section 107 may have a function of demodulating a feeding control signal that has been transmitted by the power receiving unit 3 of the electronic apparatus 2 through so-called load modulation while the power feeding unit 1 feeds power to the electronic apparatus 2. The feeding control signal may contain information necessary for the feeding operation, such as an increase request, a decrease request, or the like of the feed power from the power receiving unit 3 to the power feeding unit 1.

The control section 104 controls the feed power supplied from the power transmission driver 103 to the power feeding coil 106. The control section 104 may control the feeding operation of the power feeding unit 1 based on the feeding control signal. At this time, the control section 104 may control the power transmission driver 103 to change the feeding frequency.

(Configuration of Electronic Apparatus 2 Having Power Receiving Unit 3)

As illustrated in FIG. 2, the electronic apparatus 2 includes the power receiving unit 3 and a load 204 that is connected to the power receiving unit 3. The power receiving unit 3 includes the power receiving section 20, a rectification section 203, a control section 205, a communication section 206, a memory section 207, a frequency detection section 208, a method determination section 209, a regulator 210, and a voltage measurement section 213. The power receiving section 20 includes the power receiving coil 201, a capacitor 202A, and a capacitor 202B.

The power receiving section 20 receives power fed from the power feeding unit 1 in a non-contact manner. In the power receiving section 20, the power receiving coil 201 and the capacitor 202A configure the LC resonance circuit. The power receiving coil 201 receives power from the power feeding coil 106 of the power feeding unit 1. For example, based on an electromagnetic field generated by the power feeding coil 106 of the power feeding unit 1, the power receiving section 20 may generate an induced voltage according to change of the magnetic flux, in accordance with law of electromagnetic induction.

The power receiving section 20 is connected to the rectification section 203. The rectification section 203 rectifies power of a predetermined frequency received by the power receiving coil 201 to obtain DC power. The DC power obtained by the rectification section 203 is supplied to the regulator 210.

The regulator 210 is a voltage converter converting the power rectified by the rectification section 203 into stable power of a predetermined voltage. The DC power of the predetermined voltage obtained by the regulator 210 is supplied to the load 204. Note that a secondary battery may be charged instead of the load 204.

The communication section 206 bi-directionally communicates with the communication section 107 of the power feeding unit 1. To allow the communication section 206 to perform the communication, the series circuit of the power receiving coil 201 and the capacitor 202A is connected to the communication section 206. The series circuit detects the signal superimposed on the power supplied from the power feeding unit 1 to receive the signal transmitted from the communication section 107. Moreover, the signal transmitted from the communication section 206 is supplied to the series circuit of the power receiving coil 201 and the capacitor 202A.

The communication section 206 may have a function of transmitting the feeding control signal that is supplied from the control section 205, to the power feeding unit 1 through so-called load modulation while the power feeding unit 1 feeds power to the electronic apparatus 2 (the power receiving unit 3). Incidentally, as described above, the feeding control signal may contain information necessary for the feeding operation, such as the increase request, the decrease request, or the like of the feed power to the power feeding unit 1. In addition, the communication with the power feeding unit 1 by the communication section 206 is not limited to the load modulation, and various communication methods may be adopted similarly to the communication section 107 of the power feeding unit 1 described above. Further, the communication section 206 may have a function of receiving, from the power feeding unit 1, a signal including information that allows the feeding method to be identified.

The frequency detection section 208 is connected to a transmission path between the power receiving section 20 and the rectification section 203, and detects the feeding frequency based on the power received by the power receiving section 20. The method determination section 209 identifies the feeding method of the power feeding unit 1. The method determination section 209 is capable of identifying the feeding method of the power feeding unit 1 based on the feeding frequency detected by the frequency detection section 208. In the case where the communication section 206 receives a signal including information that allows the feeding method to be identified from the power feeding unit 1, the method determination section 209 is allowed to identify the feeding method of the power feeding unit 1 based on the signal received by the communication section 206.

The voltage measurement section 213 is connected to a transmission path between the rectification section 203 and the regulator 210, and is capable of measuring a voltage of the power rectified by the rectification section 203.

The control section 205 sets the target voltage of the power rectified by the rectification section 203, to a value corresponding to the feeding method identified by the method determination section 209. Further, the control section 205 outputs the feeding control signal that instructs the power feeding unit 1 to perform the feeding operation with the power according to the target voltage, to the power feeding unit 1 through the communication section 206.

In this way, in the first embodiment, the control section 205 corresponds to a specific example of "target voltage setting section" in the present disclosure.

The memory section 207 stores therein various kinds of control information and the like used in the control section 205.

[1.2 Operation]

In the feed system 4 according to the first embodiment, as illustrated in FIG. 2, the power receiving unit 3 includes the frequency detection section 208 and the communication section 206, and the method determination section 209 identifies the feeding method of the power feeding unit 1 based on the feeding frequency of the received power or a communication result of the communication section 206. The control section 205 performs control to set the target voltage of the power rectified by the rectification section 203, to a value corresponding to the feeding method identified by the method determination section 209.

Here, prior to description of a specific example of the operation of controlling the target voltage, the reason for changing the target voltage according to the feeding method is described.

Figure 3:
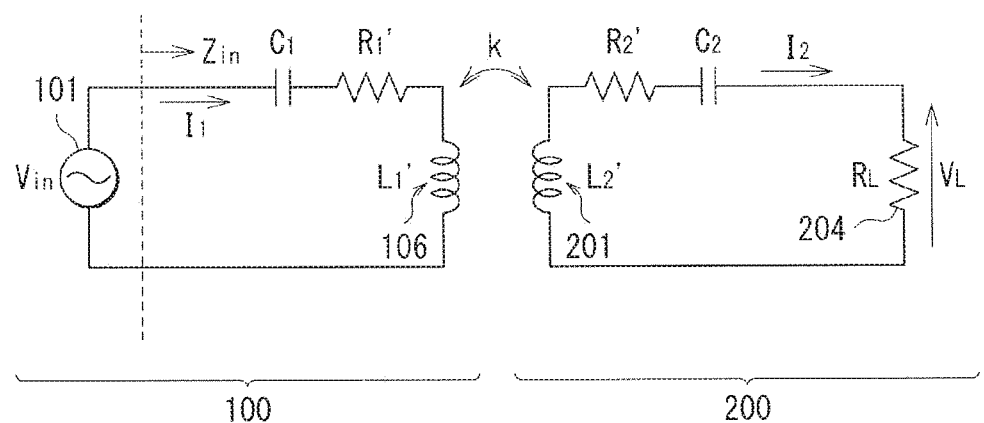
FIG. 3 is a circuit configuration illustrating an example of an equivalent circuit of a feeding transmission system of a typical non-contact feed system.

FIG. 3 illustrates an example of an equivalent circuit of a feeding transmission system of a typical non-contact feed system. In FIG. 3, like numerals are used to designate components substantially equivalent to those in the circuit illustrated in FIG. 2. A voltage $V_L$ between both ends of the load 204 on the power receiving side is represented by the following expression (1) from FIG. 3. In a feeding system 100 of FIG. 3, $V_{in}$ indicates an AC voltage, $Z_{in}$ indicates input impedance, $I_1$ indicates a current value, $C_1$ indicates a capacitance value, $R_1'$ indicates a resistance value, $L_1'$ indicates an L value of the power feeding coil 106. In a receiving system 200 of FIG. 3, in the load resistance (the load 204), a current value is denoted by $I_2$, the voltage value is denoted by $V_L$, and the resistance value is denoted by $R_L$. Moreover, in the power receiving system 200 of FIG. 3, $C_2$ indicates a capacitance value, $R_2'$ indicates a resistance value, and $L_2'$ indicates an L value of the power receiving coil 201. k indicates a coupling coefficient between the power feeding coil 106 and the power receiving coil 201.

[Numerical Expression 1]

$$V_L = I_2 R_L = \frac{\omega M I_1}{\sqrt{\left(\omega L_2' - \frac{1}{\omega C_2}\right)^2 + (R_2' + R_L)^2}} R_L \quad (1)$$

where $\omega = 2\pi f$, $M = \sqrt{L_1' L_2'} k$

As is apparent from the expression (1), the voltage $V_L$ on the power receiving side depends on various elements such as the L value $L_1'$ of the feeding system 100, the L value $L_2'$ of the receiving system 200, the coupling coefficient k, and the feeding frequency f, in addition to the load resistance value $R_L$. Since the parameters are largely varied depending on the wireless feeding method, the voltage generated on the power receiving side is inevitably varied.

Therefore, a way in which different methods are achieved with the same L value by changing the target voltage without changing the L value itself may be considered. The target voltage on the power receiving side largely depends on the shape of the power receiving coil 201 and the housing, and therefore, it is typically a matter of implementation. As for the target voltage, typically, a method in which a voltage is varied in response to the load current $I_2$, a method in which a set voltage is varied between before the load connection and after the load connection, and the like may be used. Moreover, as for the target voltage value, some methods are disclosed in previous applications. For example, in International Publication No. WO2010/035321, the target voltage value is set based on the magnitude of the received power. Changing the target voltage value based on the received power is an important method in terms of heat generation. However, in International Publication No. WO2010/035321, the wireless feeding is limited to a specific method, which does not handle methods different in feeding frequency.

In contrast, in the first embodiment, the target voltage is varied in order to deal with a plurality of feeding methods. Next, a specific example of operation of controlling the target voltage in the first embodiment will be described.

(Operation Example of Controlling Target Voltage Based on Feeding Method)

Figure 4:
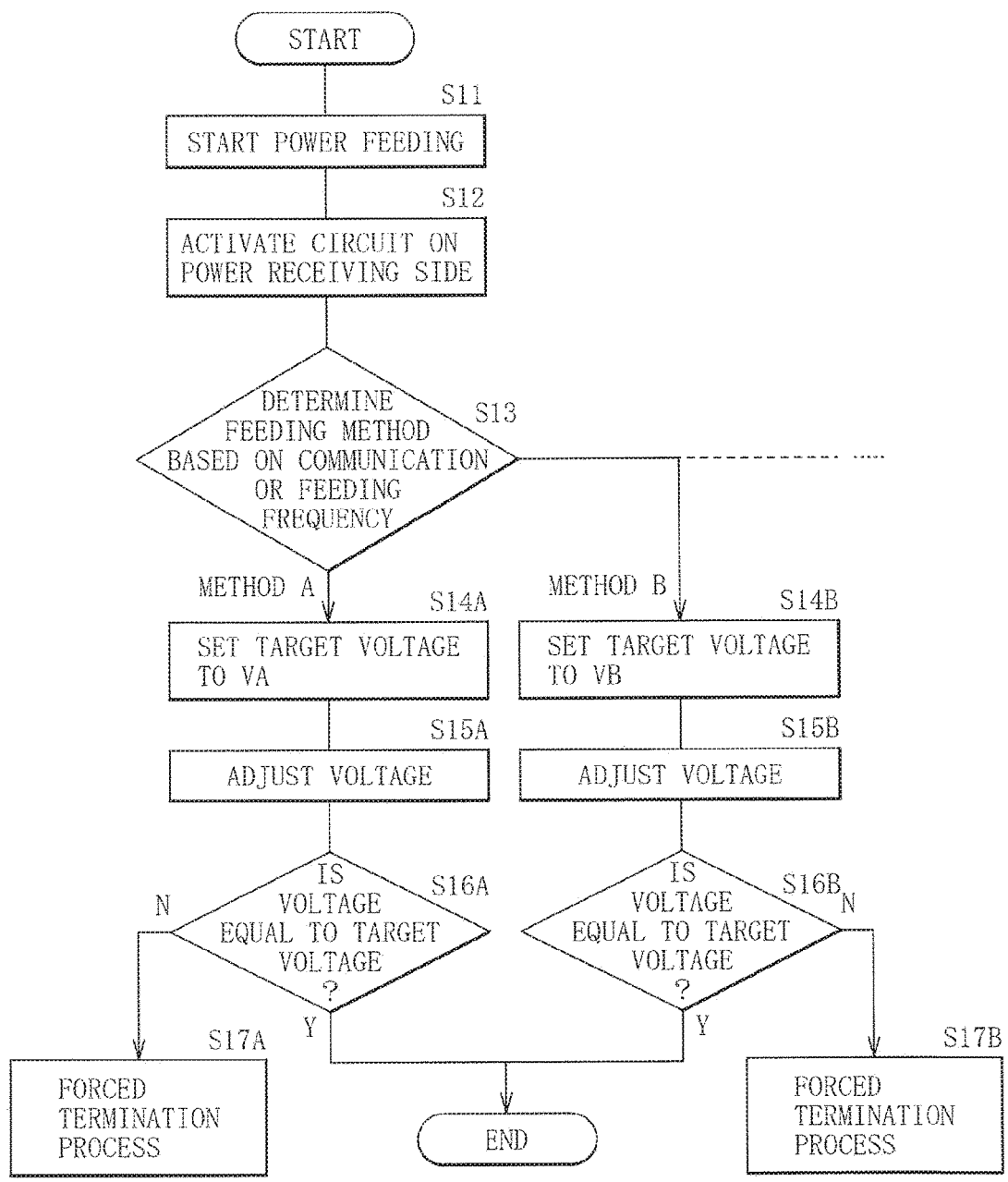
FIG. 4 is a flowchart illustrating an example of a process of controlling a target voltage on a power receiving unit side according to a feeding method in the feed system illustrated in FIG. 1.

FIG. 4 illustrates an example of a control process of controlling the target voltage based on the feeding method. As illustrated in FIG. 4, when the power feeding from the power feeding unit 1 starts (at step S11), an IC (circuits subsequent to the power receiving section 20) of the power receiving unit 3 is activated (at step S12). Typically, the feed power at this time is minimum power necessary for activation of the IC. Upon activation of the circuits, the method determination section 209 identifies the feeding method of the power feeding unit 1 (at step S13). The identification of the feeding method may be performed based on a detection result of the feeding frequency by the frequency detection section 208 or the communication result of the communication section 206.

When the feeding method is identified, the control section 205 sets the target voltage appropriate to the specification of the feeding method, and adjusts the voltage (at steps S14A and S15A, or at steps S14B and S15B). Specifically, the control section 205 outputs the feeding control signal that instructs the power feeding unit 1 to perform the feeding operation with the power according to the target voltage, to the power feeding unit 1 through the communication section 206. Incidentally, in the example of FIG. 4, a control example in which the first feeding method (the method A) and the second feeding method (the method B) are identified and the target voltage is set to VA or VB is illustrated; however, three or more feeding methods may be identified, and the target voltage may be set to any of three or more values. When the voltage reaches the target voltage range (Y at step S16A or Y at step S16B), the control section 205 ends the operation of controlling the target voltage.

When the voltage does not reach the target voltage range (N at the step S16A or N at the step S16B), it is expected that the power feeding is not performed with the appropriate voltage, and therefore, heat generation and interference caused by efficiency degradation may adversely affect. Therefore, for example, the control section 205 may perform a forced termination process of the power feeding (at a step S17A and a step S17B).

By the above-described process, it is possible to adjust the target voltage appropriate to each of the feeding method, and to handle the plurality of feeding methods with use of the same power receiving coil 201.

(Specific Setting Example of Target Voltage)

As the power control in the wireless power feeding, various controls by the frequency, the voltage, the duty ratio, and the like of the power signal are performed. Here, an example of controlling the power by the feeding frequency will be described.

Figure 5:
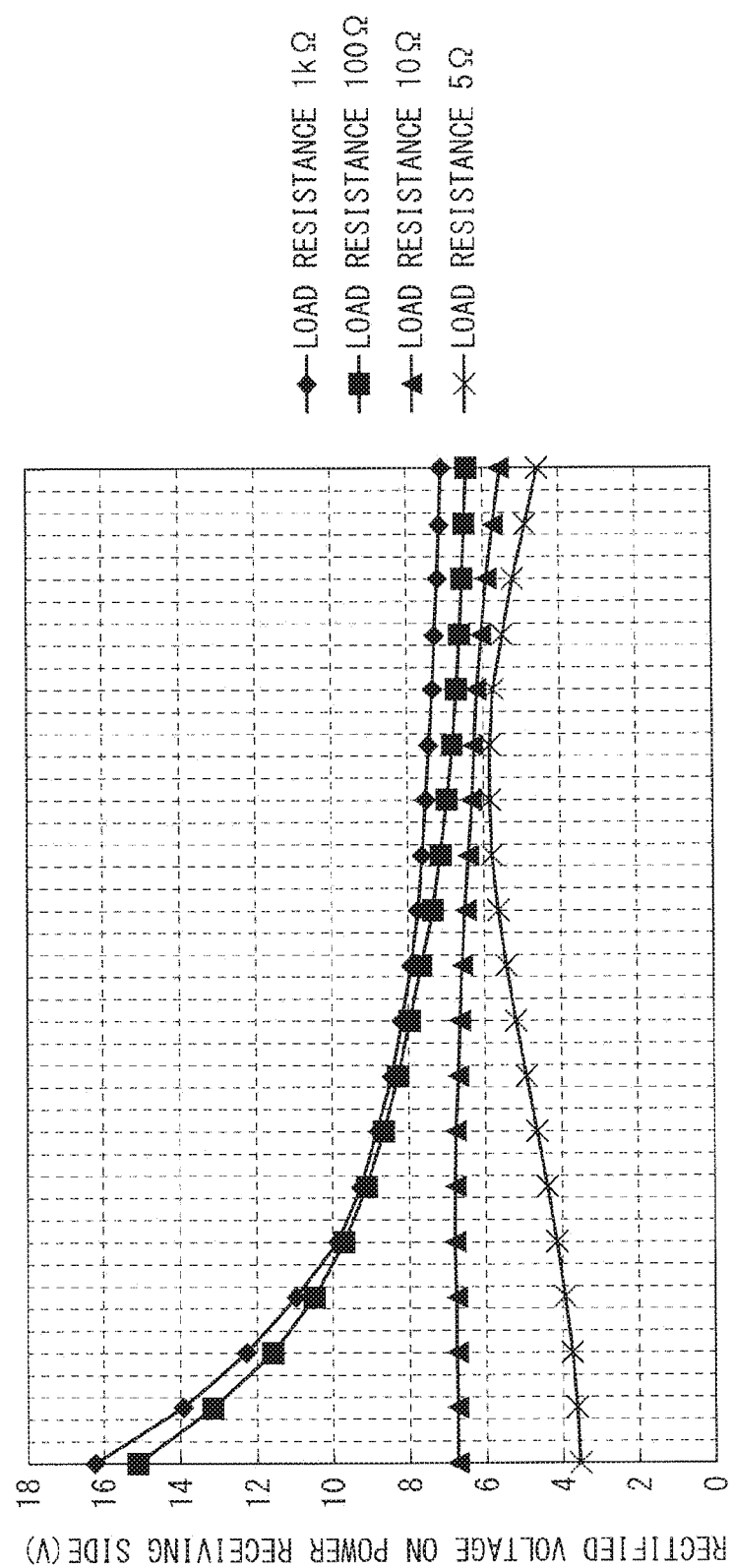
FIG. 5 is a characteristic diagram illustrating an example of relationship between a feeding frequency and a rectified voltage in a case where a feeding method is a first method (method A) in the feed system illustrated in FIG. 1.

FIG. 5 illustrates an example of relationship between the feeding frequency and the rectified voltage in the case of the first feeding method (the method A). It is found from FIG. 5 that the voltage control range is wide under the light load (at the time of initial activation) such as the load resistance of about 1 kΩ or about 100Ω. For example, when the load resistance is about 1 kΩ, it is possible to select a desired voltage within the voltage range of about 7 V to about 16 V.

However, typically, it is not preferable that the power feeding be performed at the range where the voltage is largely varied in association with variation of the load, in terms of control. Typically, after the target voltage is set under the light load (only system load) as control, a heavy load such as a battery is connected. However, if the voltage variation is large, the system may be disadvantageously stopped or large power may not be disadvantageously used.

Figure 6:
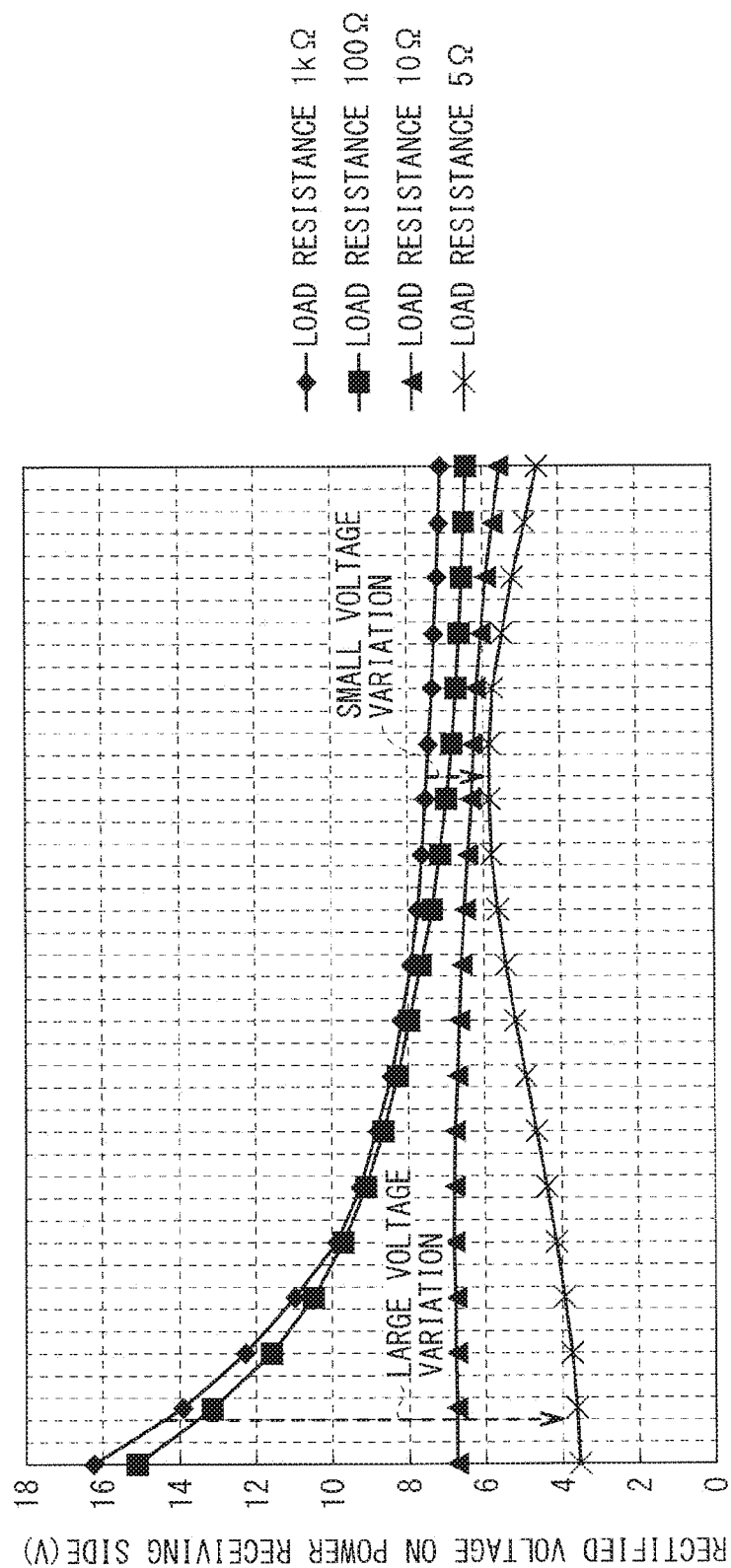
FIG. 6 is an explanatory diagram illustrating voltage variation by load resistance in the first feeding method.

As an example, FIG. 6 illustrates voltage variation by the load resistance in the method A. For example, it is assumed that the resistance value before the load (such as a buttery) connection is about 1 kΩ and the resistance value after the connection is about 5Ω (for example, about 5 V and about 1 A). It is found from FIG. 6 that there are a frequency at which the voltage variation by the variation of the load resistance is large and a frequency at which the voltage variation is small. For example, when the voltage before the load connection (the load resistance value is about 1 kΩ) is adjusted to about 7 V and then the load is connected, the voltage drop is suppressed to about 1 V. In contrast, when the voltage before the load connection is adjusted to about 14 V and then the load is connected, the voltage is varied by about 10 V or more. A major factor thereof is increase of the impedance on the power feeding side. In other words, in the example of the method A, it is found that the target voltage under the light load may be desirably set to about 7 V in terms of control.

Figure 7:
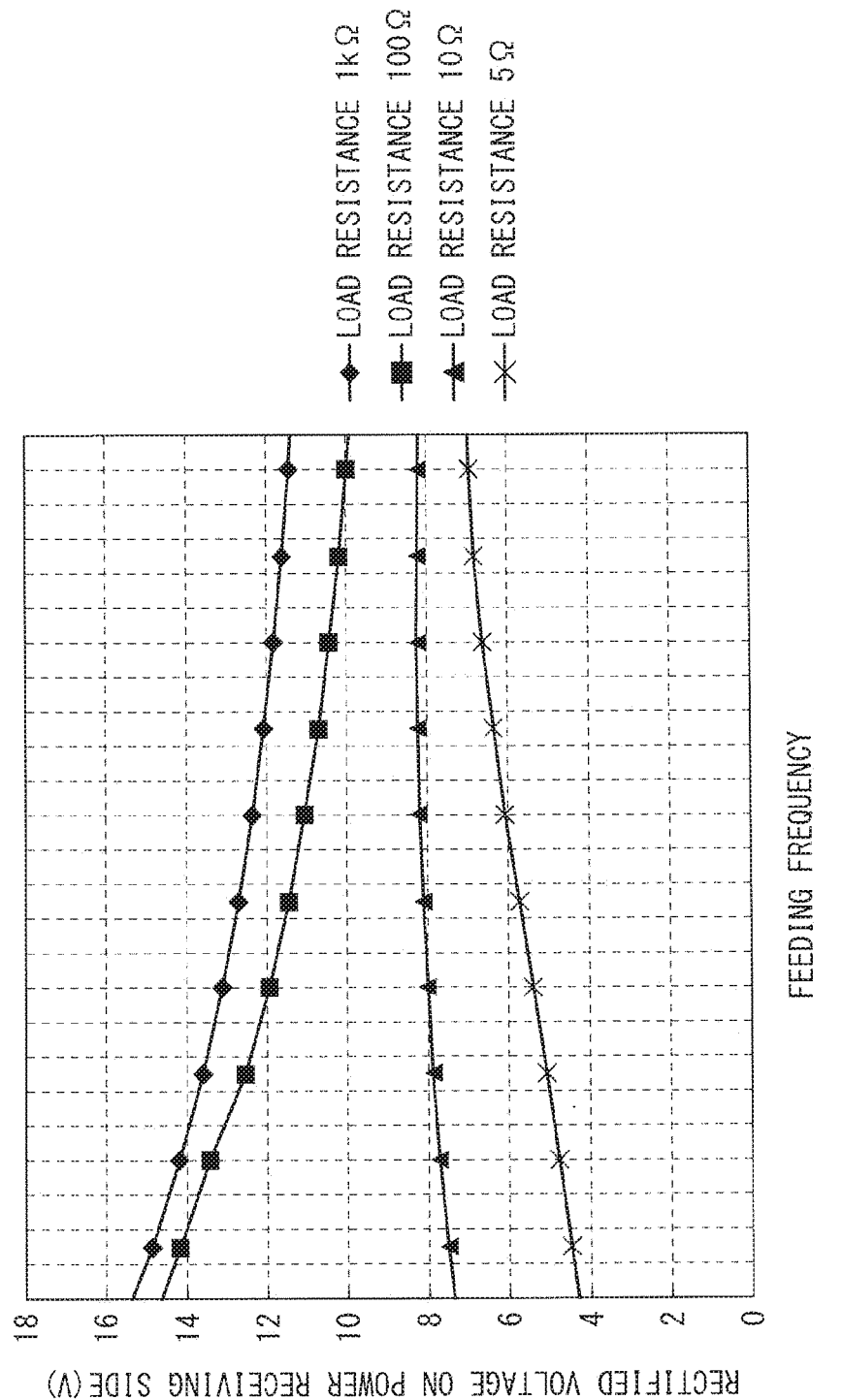
FIG. 7 is a characteristic diagram illustrating an example of relationship between a feeding frequency and a rectified voltage in a case where the feeding method is a second method (method B) in the feed system illustrated in FIG. 1.

FIG. 7 illustrates an example of relationship between the feeding frequency and the rectified voltage in the case of the second feeding method (the method B). The power receiving coil 201 used is the same as that in the method A. The rectified voltage when the load resistance is about 1 kΩ is about 11.5 V to about 15 V in the method B, and the adjustable range is narrower than that of the method A. In other words, when the target voltage is set to about 7 V for the light load that is appropriate in the method A, the voltage is adjustable to the target voltage in the method A; however, the voltage may not become the target voltage in the method B. Accordingly, it is understood that the appropriate target voltage may be varied depending on the method.

[1.3 Effects]

As described above, according to the first embodiment, the target voltage of the rectified power on the power receiving side is set to a value corresponding to the identified feeding method. Therefore, it is possible to perform the power feeding without changing over the power receiving coil 201 in each of the plurality of wireless feeding methods. Moreover, since the appropriate target voltage is set based on each of the feeding methods, it is possible to achieve the power feeding with high efficiency and high safety in each of the plurality of wireless feeding methods.

Note that the effects described in the present specification are merely examples without limitation, and other effects may be obtainable. The same applies to the following other embodiments and modifications.

2. Second Embodiment (An Example of Changing Over a Method of Conversion Operation of a Regulator According to a Feeding Method)

In the second embodiment, the method of the conversion operation of the regulator 210 is changed over according to the feeding method. FIG. 8 to FIG. 12 each illustrate a configuration example of the regulator 210 in the second embodiment. Note that, in the second embodiment, the configurations and operation other than parts relating to the configuration and the control operation of the regulator 210 may be substantially similar to those in the above-described first embodiment (FIG. 1 to FIG. 2, and FIG. 4).

In the wireless power feeding, any of a low drop out (LDO) and a DC-DC converter is frequently used as the regulator 210 that makes the voltage constant. The LDO allows the voltage difference to be lost to generate a constant voltage. For example, in the case where the input voltage is about 5.2 V and the output voltage is about 5.0 V, when the current of about 1 A is received, the loss of about 0.2 W occurs by a potential difference of about 0.2 V and the current of about 1 A. If the input voltage is about 6.0 V, the loss of about 1 W occurs by the voltage difference of about 1 V and the current of about 1 A. In other words, the LDO has characteristics that the LDO is driven at a low voltage, higher efficiency is obtained as a voltage difference is small, and a small number of external components is necessary while fine adjustment of the input voltage is necessary. On the other hand, the DC-DC converter has disadvantages that a potential difference of a certain level or more is necessary and maximum efficiency is lower than that of the LDO while the DC-DC converter allows the voltage to be constant at certain efficiency even if there is a potential difference by the switching operation.

Therefore, in the second embodiment, the method of the conversion operation of the regulator 210 is changed over according to the feeding method. As an example, a way in which the LDO is used in the above-described method A because the voltage under the light load is difficult to be generated, and the DC-DC converter is used in the method B because the voltage under the light load is high.

In the second embodiment, the regulator 210 converts the power rectified by the rectification section 203 into power of the desired voltage, and has a plurality of methods used for the conversion operation. The control section 205 changes over the method of the conversion operation performed by the regulator 210, according to the feeding method identified by the method determination section 209.

In FIG. 8 to FIG. 12, cases where the regulator 210 includes two types of conversion circuits, namely, a DC-DC converter 211 and an LDO 212 are described below as configuration examples. The DC-DC converter 211 is called a switching regulator. The DC-DC converter 211 is a circuit that switches the input power source by a switching element at relatively high speed, and rectifies and smoothes the switched power source to be DC power source of the desired voltage. The DC-DC converter 211 has a wide variable range of the input voltage.

The LDO 212 is a series regulator that controls the voltage drop amount in a transistor, and regulates power to DC power of the desired voltage. When the variable range of the input voltage is narrow and the input voltage is slightly higher than the output voltage, the LDO 212 performs efficient voltage conversion.

The regulator 210 uses one circuit of the DC-DC converter 211 and the LDO 212 to convert the voltage into a stable constant voltage. The circuit used for the conversion operation by the regulator 210 is determined by instruction from the control section 205 that controls power receiving.

[2.1 First Configuration Example of Regulator 210]

Figure 8:
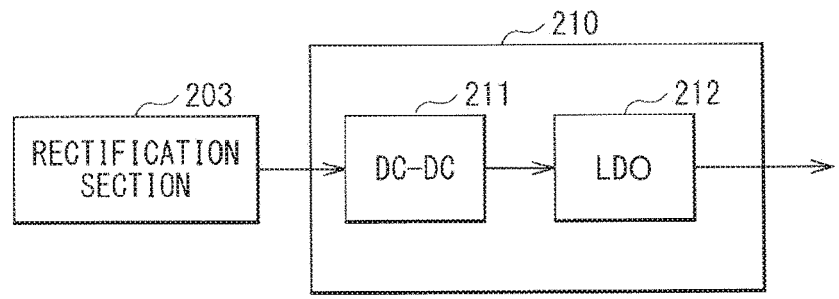
FIG. 8 is a block diagram illustrating a first configuration example of a regulator in a feed system according to a second embodiment.

FIG. 8 illustrates a first configuration example of the regulator 210. In the first configuration example, the DC-DC converter 211 and the LDO 212 are connected in series to each other. The LDO 212 is connected in a rear stage of the DC-DC converter 211 in the example of FIG. 8; however, the connection order may be inverted. The DC-DC converter 211 and the LDO 212 are set so that only one thereof is actuated. Stopped one out of the DC-DC converter 211 and the LDO 212 outputs the input signal as it is.

Figure 9:
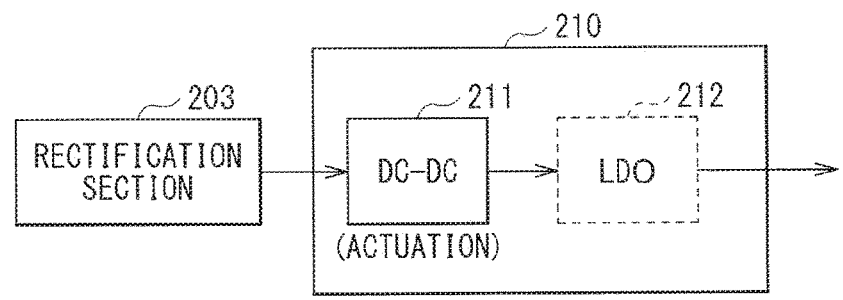
FIG. 9 is a block diagram illustrating a first operation state of the regulator according to the first configuration example illustrated in FIG. 8.
Figure 10:
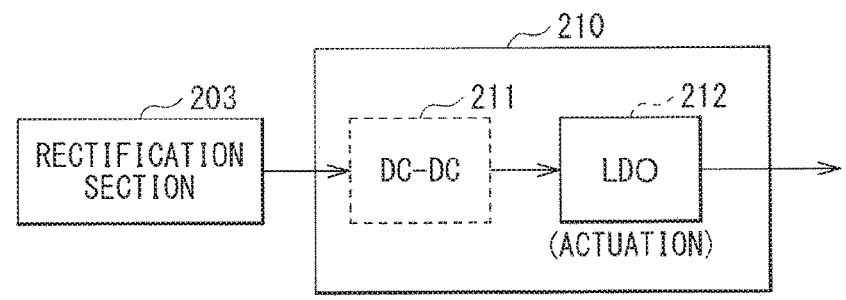
FIG. 10 is a block diagram illustrating a second operation state of the regulator according to the first configuration example illustrated in FIG. 8.

FIG. 9 illustrates a first operation state of the regulator 210 according to the first configuration example illustrated in FIG. 8. FIG. 10 illustrates a second operation state of the regulator 210 according to the first configuration example illustrated in FIG. 8.

When the DC-DC converter 211 is used, as illustrated in FIG. 9, the control section 205 actuates the DC-DC converter 211, and allows the voltage to pass through the LDO 212. As a result, the voltage converted by the DC-DC converter 211 is obtained at the output part of the regulator 210.

Moreover, when the LDO 212 is used, as illustrated in FIG. 10, the control section 205 actuates the LDO 212, and allows the voltage to pass through the DC-DC converter 211. As a result, the voltage converted by the LDO 212 is obtained at the output part of the regulator 210.

[2.2 Second Configuration Example of Regulator 210]

Figure 11:
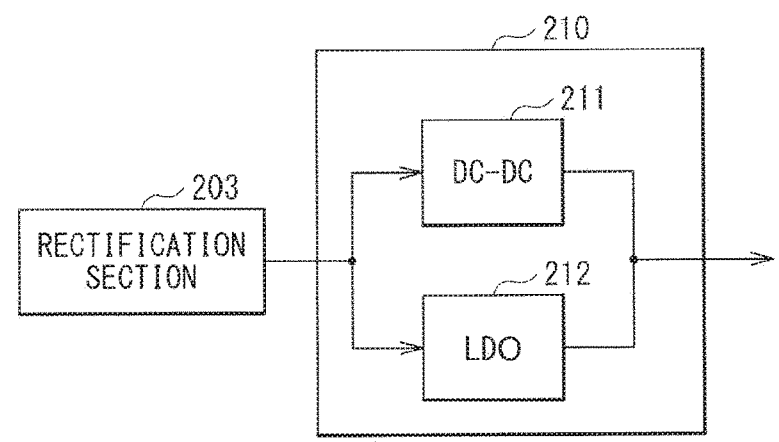
FIG. 11 is a block diagram illustrating a second configuration example of the regulator.

FIG. 11 illustrates a second configuration example of the regulator 210. In the second configuration example, the DC-DC converter 211 and the LDO 212 are connected in parallel to each other. The control section 205 controls the actuation side so that any one of the DC-DC converter 211 and the LDO 211 is actuated.

[2.3 Third Configuration Example of Regulator 210]

Figure 12:
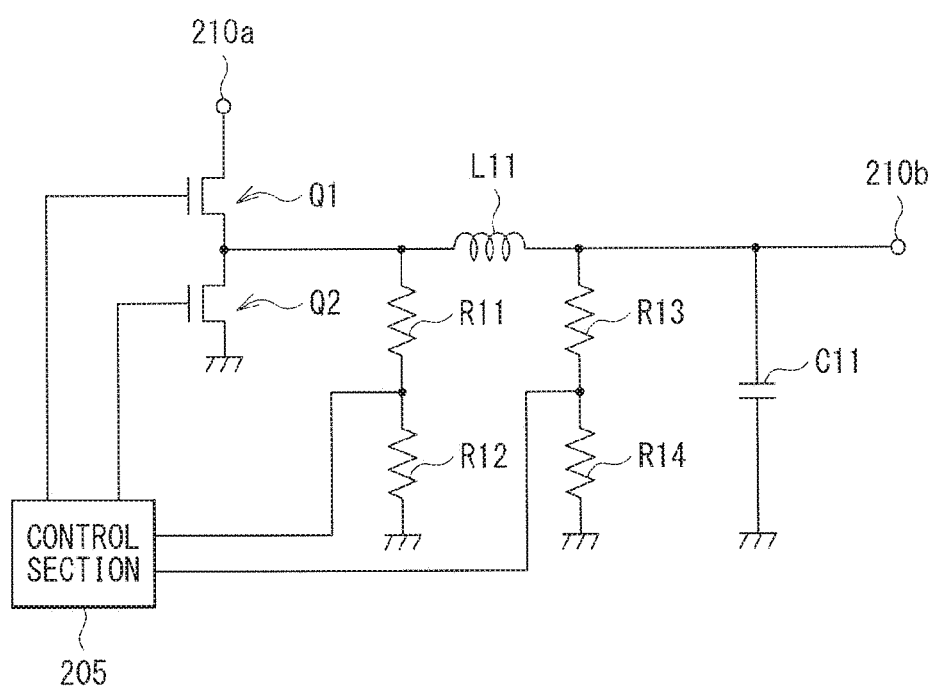
FIG. 12 is a circuit diagram illustrating a third configuration example of the regulator.

FIG. 12 illustrates a third configuration example of the regulator 210. In the third configuration example, the DC-DC converter 211 shares a circuit with the LDO 212. As illustrated in FIG. 12, two transistors Q1 and Q2 are connected between an input terminal 210a of the regulator 210 and a ground potential part. The two transistors Q1 and Q2 are controlled to be turned on or off by the control section 205. A connection point between the transistors Q1 and Q2 is connected to an output terminal 210b of the regulator 210 through a coil L11. An end of a smoothing capacitor C11 is connected to a connection point between the coil L11 and the output terminal 210b.

A series circuit of resistors R11 and R12 for voltage detection is connected between the ground potential part and the connection point between the transistors Q1 and Q2 and the coil L11. Moreover, a series circuit of resistors R13 and R14 for voltage detection is connected between the ground potential part and the connection point between the coil L11 and the output terminal 210b. The control section 205 detects a voltage of a connection point between the resistors R11 and R12 and a voltage of a connection point between the resistors R13 and R14.

When the regulator 210 is used as the DC-DC converter 211 with the configuration illustrated in FIG. 12, the control section 205 turns on or off the two transistors Q1 and Q2 at a high speed, to perform switching operation. At this time, the control section 205 monitors the voltage charged to the smoothing capacitor C11, from the voltage at the connection point between the resistors R13 and R14, and controls the switching state of each of the two transistors Q1 and Q2 so that the detected voltage becomes appropriate.

Further, when the regulator 210 is used as the LDO 212 with the configuration illustrated in FIG. 12, the control section 205 controls the transistor Q1 to operate as a voltage control element. The transistor Q2 is set to an open state by the control section 205. At this time, the control section 205 detects the voltage at the connection point between the resistors R11 and R12, and controls the voltage drop amount of the transistor Q1 so that the detected voltage becomes appropriate.

[2.4 Effects]

As described above, according to the second embodiment, the method of the conversion operation of the regulator 210 is changed over according to each of the plurality of wireless feeding methods. Therefore, it is possible to achieve the power feeding with high efficiency and high safety in each of the plurality of wireless feeding methods.

3. Third Embodiment (An Example of Controlling a Protection Setting Voltage According to a Feeding Method)

[3.1 Configuration]

Figure 13:
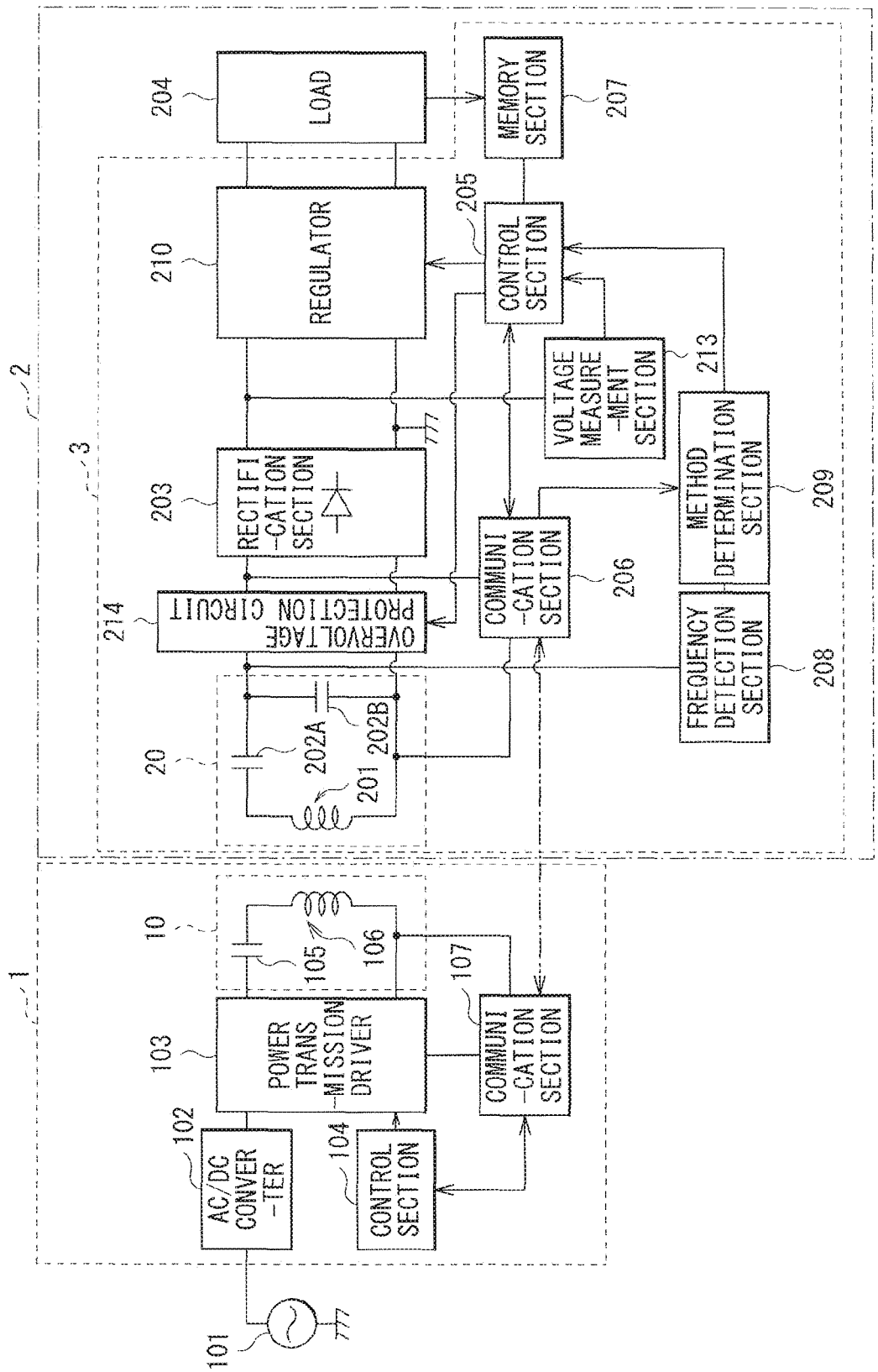
FIG. 13 is a block diagram illustrating an example of a circuit configuration of a feed system according to a third embodiment.
Figure 14:
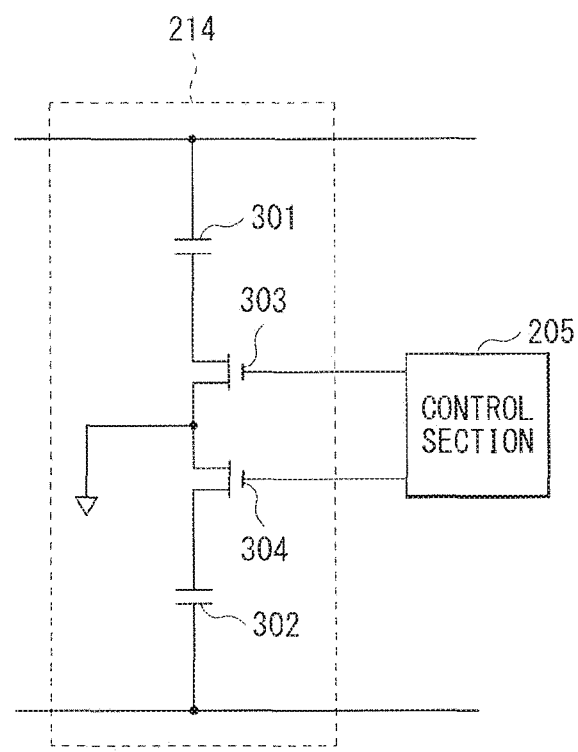
FIG. 14 is a circuit diagram illustrating a configuration example of an overvoltage protection circuit in the feed system illustrated in FIG. 13.

FIG. 13 illustrates an example of a circuit configuration of a feed system 4 according to a third embodiment. FIG. 14 illustrates a configuration example of an overvoltage protection circuit 214 in the feed system 4 illustrated in FIG. 13. In the third embodiment, as illustrated in FIG. 13, the power receiving unit 3 includes the overvoltage protection circuit 214, and the control section 205 controls an overvoltage protection (OVP) voltage in the overvoltage protection circuit 214 according to the feeding method. Incidentally, in the third embodiment, configurations and operation other than parts relating to the configuration and the control operation of the overvoltage protection circuit 214 may be substantially similar to those of the above-described first embodiment (FIG. 1 to FIG. 2, and FIG. 4). Moreover, a configuration obtained by combining the third embodiment and the above-described second embodiment (FIG. 8 to FIG. 12) may be available.

The overvoltage protection circuit 214 lowers the voltage of the power received by the power receiving section 20 so that the voltage does not exceed the overvoltage protection voltage. The control section 205 sets the protection voltage to a value corresponding to the feeding method identified by the method determination section 209.

As described above, in the third embodiment, the control section 205 corresponds to a specific example of "protection voltage setting section" in the present disclosure.

The overvoltage protection voltage is described now. The overvoltage protection voltage is a voltage set to prevent the IC from being damaged, and the overvoltage protection circuit 214 operates when the voltage exceeds the overvoltage protection voltage. Examples of the overvoltage protection circuit 214 may include a method of allowing a large capacitor typically called a cramp circuit to be short-circuited, and a Zener diode.

As illustrated in FIG. 13, the overvoltage protection circuit 214 is disposed on a transmission path between the power receiving section 20 and the rectification section 203. As illustrated in FIG. 14, for example, the overvoltage protection circuit 214 may include a capacitor 301 and a capacitor 302. A first end of the capacitor 301 is connected to a transmission path on a high voltage side of the power receiving unit 3, and a first end of the capacitor 302 is connected to a transmission path on a low voltage side of the power receiving unit 3. Moreover, MOSFETs 303 and 304 are provided between a second end of the capacitor 301 and a second end of the capacitor 302. A gate of each of the MOSFETs 303 and 304 is connected to the control section 205. In the configuration example of FIG. 14, a circuit that allows the MOSFETs 303 and 304 to be turned on to lower the voltage when the measured voltage exceeds the overvoltage protection voltage is configured.

The overvoltage protection is important for not only withstand voltage of the IC but also prevention of excessive lowering of efficiency. For example, in the case where the regulator 210 is the LDO, if a circumstance of generating about 30 V occurs, loss of 25 V×current value occurs when the output is regulated to about 5 V. Even if the current value is about 100 mA, loss of about 2.5 W occurs. Specifically, in the case where the LDO is operated at a constant voltage basically, the overvoltage protection voltage should not be excessively increased even if the withstand voltage of the IC is sufficient. However, there is a possibility that operation may be performed or is inevitably performed at slightly higher voltage in other methods. For example, in the case of the third embodiment, the overvoltage protection voltage may be desirably set to about 12 V in the above-described method A; however, there is a possibility that operation is not performed by the method B in this setting. Therefore, it is necessary to appropriately change over the overvoltage protection voltage.

[3.2 Effects]

As described above, according to the third embodiment, the protection voltage is appropriately set according to each of the plurality of wireless feeding methods. Therefore, it is possible to achieve the power feeding with high efficiency and high safety in each of the plurality of wireless feeding methods.

4. Fourth Embodiment (An Example of Changing Over a Circuit Configuration (A Circuit Constant) According to a Feeding Method)

[4.1 Configuration Example in Which Overvoltage Protection Circuit 214 is Changed Over]

In the present configuration example, the configurations and operation other than parts relating to the configuration and the control operation of the overvoltage protection circuit 214 may be substantially similar to those of the above-described first embodiment (FIG. 1 to FIG. 2, and FIG. 4). Moreover, in the present configuration example, the basic configuration of the entire feed system 4 including the overvoltage protection circuit 214 may be substantially similar to that in FIG. 13. Further, a configuration obtained by combining the present configuration example and the above-described second embodiment (FIG. 8 to FIG. 12) may be available.

In the above-described third embodiment (FIG. 14), the protection voltage is set to a voltage according to the feeding method, while the circuit configuration (the circuit constant) itself of the overvoltage protection circuit 214 is not changed. However, an appropriate circuit constant may be varied according to the feeding method, in addition to the protection voltage. Therefore, in the present configuration example, in addition to the protection voltage, the circuit configuration (the circuit constant) of the overvoltage protection circuit 214 is changed over to an appropriate circuit configuration (an appropriate circuit constant) according to the feeding method.

Figure 15:
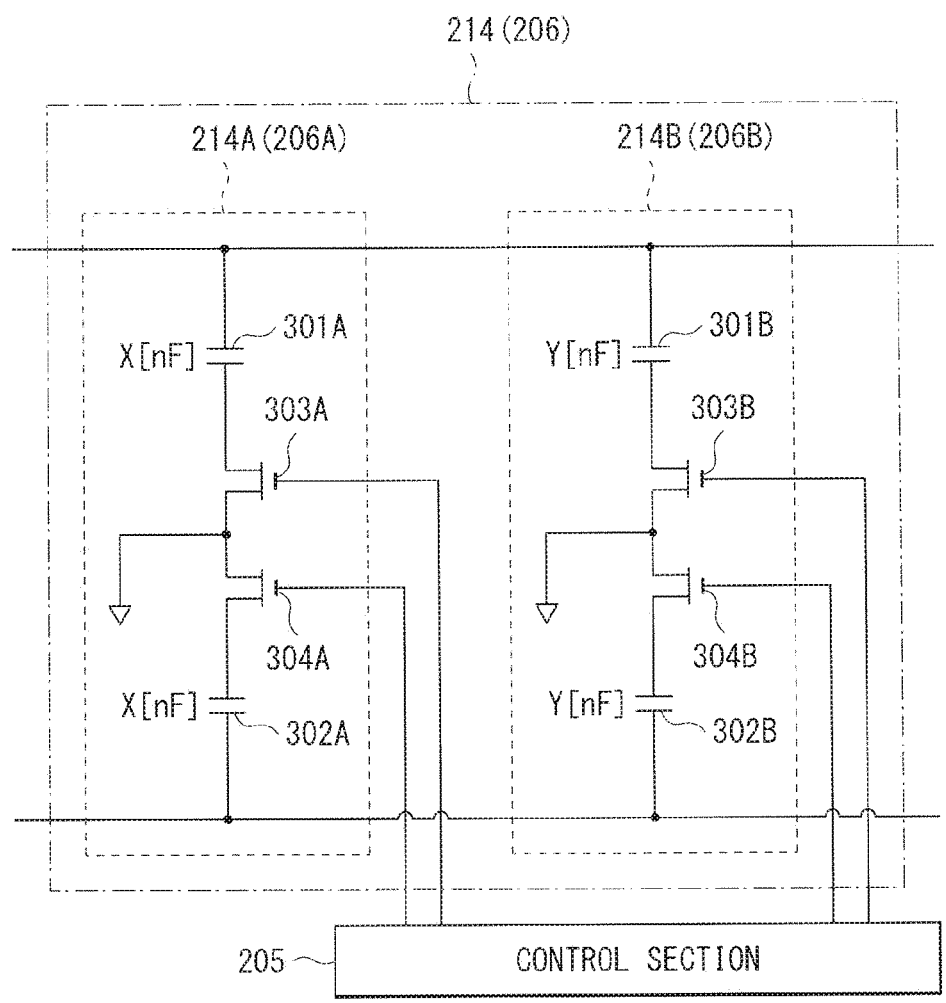
FIG. 15 is a circuit diagram illustrating a first configuration example of an overvoltage protection circuit or a communication section in a feed system according to a fourth embodiment.

FIG. 15 illustrates a first configuration example of the overvoltage protection circuit 214 according to the fourth embodiment. In the first configuration example of FIG. 15, the overvoltage protection circuit 214 has a plurality of overvoltage protection circuits 214A and 214B. The overvoltage protection circuit 214A is configured of capacitors 301A and 302A and MOSFETs 303A and 304A. A gate of each of the MOSFETs 303A and 304A is connected to the control section 205. The overvoltage protection circuit 214B is configured of capacitors 301B and 302B and MOSFETs 303B and 304B. A gate of each of the MOSFETs 303B and 304B is connected to the control section 205. The circuit configuration (the circuit constant) of the overvoltage protection circuit 214A is a configuration suitable for a case where the feeding method is the above-described method A. Specifically, a capacitance value of each of the capacitors 301A and 302A is X [nF]. Moreover, the circuit configuration (the circuit constant) of the overvoltage protection circuit 214B is a configuration suitable for a case where the feeding method is the above-described method B. Specifically, a capacitance value of each of the capacitors 301B and 302B is Y [nF] that is different from the capacitance value of each of the capacitors 301A and 302A.

Figure 16:
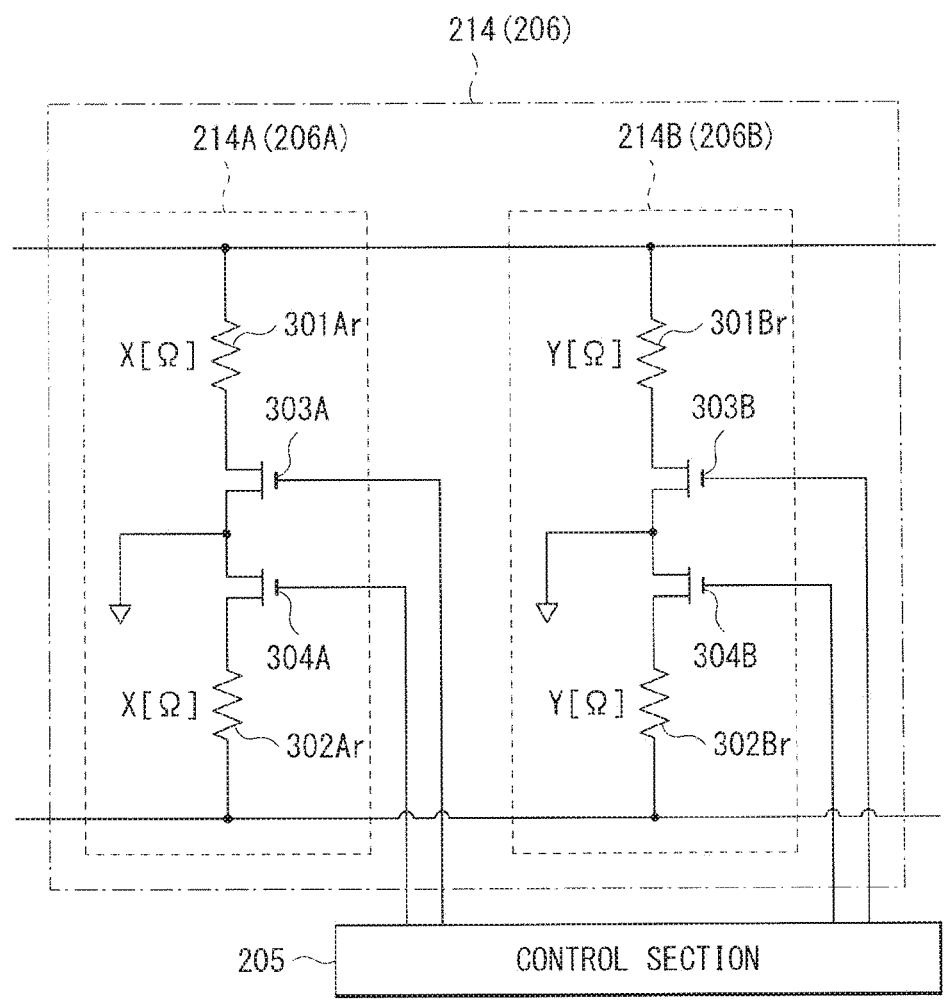
FIG. 16 is a circuit diagram illustrating a second configuration example of the overvoltage protection circuit or the communication section in the feed system according to the fourth embodiment.

FIG. 16 illustrates a second configuration example of the overvoltage protection circuit 214 according to the fourth embodiment. In the second configuration example of FIG. 16, resistors 301Ar and 302Ar are used in the overvoltage protection circuit 214A in place of the capacitors 301A and 302A of the first configuration example of FIG. 15. Moreover, resistors 301Br and 302Br are used in the overvoltage protection circuit 214B in place of the capacitors 301B and 302B. The circuit configuration (the circuit constant) of the overvoltage protection circuit 214A is a configuration suitable for a case where the feeding method is the above-described method A. Specifically, a resistance value of each of the resistors 301Ar and 302Ar is X [Ω]. Moreover, the circuit configuration (the circuit constant) of the overvoltage protection circuit 214B is a configuration suitable for a case where the feeding method is the above-described method B. Specifically, a resistance value of each of the resistors 301Br and 302Bt is Y [Ω] that is different from the resistance value of each of the resistors 301Ar and 302Ar.

In the configuration example illustrated in FIG. 15 or FIG. 16, the control section 205 controls the overvoltage protection circuit 214 so that any one of the plurality of overvoltage protection circuits 214A and 214B is selectively used according to the feeding method identified by the method determination section 209. In the case where the feeding method is the above-described method A, the control section 205 turns on the MOSFETs 303A and 304A of the overvoltage protection circuit 214A to lower the voltage when the measured voltage exceeds the overvoltage protection voltage of the method A. In addition, in the case where the feeding method is the above-described method B, the control section 205 turns on the MOSFETs 303B and 304B to lower the voltage when the measured voltage exceeds the overvoltage protection voltage of the method B.

[4.2 Configuration Example in Which Communication Section 206 is Changed Over]

In the above description, the configuration example in which the circuit configuration (the circuit constant) of the overvoltage protection circuit 214 is changed over has been illustrated. However, the communication section 206 may have a configuration similar to that of the overvoltage protection circuit 214 illustrated in FIG. 15 and FIG. 16, and the circuit configuration (the circuit constant) of the communication section 206 may be changed over to an appropriate circuit configuration (an appropriate circuit constant) according to the feeding method.

For example, the communication section 206 may have a plurality of communication circuits 206A and 206B as with the configuration example illustrated in FIG. 15 or FIG. 16. In the configuration example illustrated in FIG. 15 or FIG. 16, the control section 205 controls the communication section 206 so that any one of the plurality of communication circuits 206A and 206B is selectively used according to the feeding method identified by the method determination section 209. The control section 205 selectively turns on the MOSFETs 303A and 304A or the MOSFETs 303B and 304B to change over the communication circuits 206A and 206B according to the feeding method.

Note that the configurations and operation other than parts relating to the configuration and the control operation of the communication section 206 may be substantially similar to those in the above-described first embodiment (FIG. 1 to FIG. 2, and FIG. 4). Moreover, a configuration obtained by combining the present configuration example and one of the above-described second embodiment (FIG. 8 to FIG. 12) and the above-described third embodiment (FIG. 13 and FIG. 14) may be available. Moreover, both of the overvoltage protection circuit 214 and the communication section 206 may have a plurality of circuit configurations (circuit constants) according to the feeding methods, and the control section 205 may change over the circuit configurations (the circuit constants) of both to an appropriate circuit configuration (an appropriate circuit constant) according to the feeding method.

[4.3 Effects]

As described above, according to the fourth embodiment, one or both of the circuit configurations of the overvoltage protection circuit 214 and the communication section 206 are changed over according to each of the plurality of wireless feeding methods. Therefore, it is possible to achieve power feeding with high efficiency and high safety in each of the plurality of wireless feeding methods.

5. Other Embodiments

The technology of the present disclosure is not limited to the above-described embodiments, and various modifications may be made.

For example, the present technology may be configured as follows.

(1) A power receiving unit including:

a power receiving section configured to receive power that is fed from a power feeding unit in a non-contact manner;

a rectification section configured to rectify the power received by the power receiving section;

a method determination section configured to identify a feeding method of the power feeding unit; and a target voltage setting section configured to set a target voltage of the power rectified by the rectification section, to a value corresponding to the feeding method identified by the method determination section.

(2) The power receiving unit according to (1), further including:

a communication section configured to communicate with the power feeding unit; and a control section configured to output a signal to the power feeding unit through the communication section, the signal instructing the power feeding unit to perform feeding operation with the power corresponding to the target voltage.

(3) The power receiving unit according to (1) or (2), further including a frequency detection section configured to detect a feeding frequency based on the power received by the power receiving section, wherein the method determination section identifies the feeding method of the power feeding unit based on the feeding frequency detected by the frequency detection section.

(4) The power receiving unit according to (1) or (2), further including a communication section configured to receive a signal from the power feeding unit, the signal containing information that allows the feeding method to be identified, wherein the method determination section identifies the feeding method of the power feeding unit based on the signal received by the communication section.

(5) The power receiving unit according to any one of (1) to (4), further including:

a regulator configured to convert the power rectified by the rectification section into power of a desired voltage, the regulator having a plurality of methods used in the conversion operation; and a control section configured to change over the method of the conversion operation performed by the regulator, according to the feeding method identified by the method determination section.

(6) The power receiving unit according to any one of (1) to (5), further including:

a protection circuit configured to lower a voltage of the power received by the power receiving section not to exceed a protection voltage; and a protection voltage setting section configured to set the protection voltage to a value corresponding to the feeding method identified by the method determination section.

(7) The power receiving unit according to any one of (1) to (5), further including:

a protection circuit section having a plurality of overvoltage protection circuits different in circuit constant from one another; and a control section configured to control the protection circuit section to selectively use any one of the plurality of overvoltage protection circuits according to the feeding method identified by the method determination section.

(8) The power receiving unit according to any one of (1) to (7), further including:

a communication section having a plurality of communication circuits different in circuit constant from one another; and a control section configured to control the communication section to selectively use any one of the plurality of communication circuits according to the feeding method identified by the method determination section.

(9) A power receiving control method, including:

receiving power that is fed from a power feeding unit in a non-contact manner;

rectifying the received power;

identifying a feeding method of the power feeding unit by a method determination section; and setting, by a target voltage setting section, a target voltage of the rectified power to a value corresponding to the feeding method identified by the method determination section.

(10) A non-contact feed system provided with a power feeding unit and a power receiving unit, the power receiving unit including:

a power receiving section configured to receive power that is fed from the power feeding unit in a non-contact manner;

a rectification section configured to rectify the power received by the power receiving section;

a method determination section configured to identify a feeding method of the power feeding unit; and a target voltage setting section configured to set a target voltage of the power rectified by the rectification section, to a value corresponding to the feeding method identified by the method determination section.

(11) An electronic apparatus provided with a power receiving unit and a load connected to the power receiving unit, the power receiving unit including:

a power receiving section configured to receive power that is fed from a power feeding unit in a non-contact manner;

a rectification section configured to rectify the power received by the power receiving section;

a method determination section configured to identify a feeding method of the power feeding unit; and a target voltage setting section configured to set a target voltage of the power rectified by the rectification section, to a value corresponding to the feeding method identified by the method determination section.

It should be understood by those skilled in the art that various modifications, combinations, sub-combinations, and alterations may occur depending on design requirements and other factors insofar as they are within the scope of the appended claims or the equivalents thereof.

What is claimed is:

1. A power receiving unit comprising:
   a power receiving section configured to receive power that is fed from a power feeding unit wirelessly;
   a determination circuit configured to identify a feeding method of the power feeding unit; and
   a control circuit configured to set a target voltage of the power to a value corresponding to the feeding method identified by the determination circuit.

2. The power receiving unit according to claim 1, further comprising:
   a rectification circuit configured to rectify the power received by the power receiving section.

3. The power receiving unit according to claim 1, further comprising:
   a communication circuit configured to communicate with the power feeding unit, wherein
   the control circuit is configured to output a signal to the power feeding unit through the communication circuit, the signal instructing the power feeding unit to perform feeding operation with the power corresponding to the target voltage.

4. The power receiving unit according to claim 1, further comprising:
a frequency detection circuit configured to detect a feeding frequency based on the power received by the power receiving section, wherein the determination circuit identifies the feeding method of the power feeding unit based on the feeding frequency detected by the frequency detection circuit.

5. The power receiving unit according to claim 1, further comprising:
a communication circuit configured to receive a signal from the power feeding unit, the signal containing information that allows the feeding method to be identified, wherein the determination circuit identifies the feeding method of the power feeding unit based on the signal received by the communication circuit.

6. The power receiving unit according to claim 1, further comprising:
a regulator configured to convert the power rectified by the rectification circuit into power of a desired voltage, the regulator having a plurality of methods used in the conversion operation, wherein
the control circuit is configured to change over the method of the conversion operation performed by the regulator, according to the feeding method identified by the determination circuit.

7. The power receiving unit according to claim 1, further comprising:
a protection circuit configured to lower a voltage of the power received by the power receiving section not to exceed a protection voltage; and
a protection voltage setting circuit configured to set the protection voltage to a value corresponding to the feeding method identified by the determination circuit.

8. The power receiving unit according to claim 1, further comprising:
a protection circuit having a plurality of overvoltage protection circuits different in circuit constant from one another, wherein
the control circuit is configured to control the protection circuit to selectively use any one of the plurality of overvoltage protection circuits according to the feeding method identified by the determination circuit.

9. The power receiving unit according to claim 1, further comprising:
a communication circuit having a plurality of communication sub-circuits different in circuit constant from one another, wherein
the control circuit is configured to control the communication circuit to selectively use any one of the plurality of communication sub-circuits according to the feeding method identified by the determination circuit.

10. The power receiving unit according to claim 1, wherein the power receiving section includes a coil and at least one capacitor.

11. The power receiving unit according to claim 10, wherein the control circuit sets the target voltage without changing a L value of the coil.

12. The power receiving unit according to claim 6, wherein the regulator includes a DC-DC convertor or a low drop out.

13. The power receiving unit according to claim 12, wherein the low drop out allows the voltage difference to be lost to generate a constant voltage.

14. The power receiving unit according to claim 12, wherein the DC-DC converter has a wide variable range of the input voltage.

* * * * *